(12) United States Patent
Eichfeld et al.

(10) Patent No.: US 10,250,968 B2
(45) Date of Patent: Apr. 2, 2019

(54) LOUDSPEAKER SYSTEM

(71) Applicant: Bose Corporation, Framingham, MA (US)

(72) Inventors: Jahn Dmitri Eichfeld, Natick, MA (US); Wontak Kim, Watertown, MA (US); James Michael Rush, Northborough, MA (US); Michael W. Stark, Acton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/701,660

(22) Filed: Sep. 12, 2017

(65) Prior Publication Data

US 2018/0077485 A1 Mar. 15, 2018

Related U.S. Application Data

(60) Provisional application No. 62/393,388, filed on Sep. 12, 2016.

(51) Int. Cl.
*H04R 1/24* (2006.01)
*H04R 1/26* (2006.01)
(Continued)

(52) U.S. Cl.
CPC ............ *H04R 1/24* (2013.01); *H04N 21/233* (2013.01); *H04R 1/26* (2013.01); *H04R 1/2803* (2013.01);
(Continued)

(58) Field of Classification Search
CPC ... H04R 5/00; H04R 5/02; H04R 1/24; H04R 1/26; H04R 1/2803; H04R 1/403;
(Continued)

(56) References Cited

U.S. PATENT DOCUMENTS 5,850,457 A * 12/1998 Gefvert ............... H04R 5/02
381/300
5,870,484 A * 2/1999 Greenberger ............ H04R 5/02
381/17

(Continued)

FOREIGN PATENT DOCUMENTS

WO 2010013180 A1 4/2010

OTHER PUBLICATIONS

The International Search Report and the Written Opinion of the International Searching Authority dated Nov. 24, 2017 for PCT Application No. PCT/US2017/051109.

*Primary Examiner* — Sunita Joshi
(74) *Attorney, Agent, or Firm* — Brian M. Dingman; Dingman IP Law, PC

(57) ABSTRACT

A multimedia system includes at least a first pair of satellite loudspeakers for radiating left and right channel signals, the satellite loudspeakers having a first lower cutoff frequency. The loudspeaker system also includes a separate subwoofer having a first upper cutoff frequency. The first lower cutoff frequency is higher in frequency than the first upper cutoff frequency. The loudspeaker system also includes a center loudspeaker array. The center loudspeaker array radiates center channel signals, and also directionally radiates left and right channel signals in the frequency range between the first lower cutoff frequency and the first upper cutoff frequency. The multi-channel loudspeaker system may also incorporate additional satellite loudspeakers for reproduction of surround channel signals.

25 Claims, 12 Drawing Sheets

(51) Int. Cl.
*H04R 1/28* (2006.01)
*H04R 1/40* (2006.01)
*H04R 3/12* (2006.01)
*H04R 3/14* (2006.01)
*H04S 3/00* (2006.01)
*H04N 21/233* (2011.01)

(52) U.S. Cl.
CPC ............ *H04R 1/2819* (2013.01); *H04R 1/403* (2013.01); *H04R 3/12* (2013.01); *H04S 3/008* (2013.01); *H04R 3/14* (2013.01); *H04R 2203/12* (2013.01); *H04R 2420/07* (2013.01)

(58) Field of Classification Search
CPC ............. H04R 2203/12; H04S 2400/01; H04S 2400/03; H04S 2400/05; H04S 2400/07; H04S 3/008; H04N 21/233
See application file for complete search history.

(56) References Cited

U.S. PATENT DOCUMENTS

| | | | |
|---|---|---|---|
| 2003/0068051 A1* | 4/2003 | Bottum | H04R 1/26 381/99 |
| 2011/0116641 A1* | 5/2011 | Bergere | H04S 3/00 381/17 |
| 2016/0227315 A1 | 8/2016 | Kim | |
| 2016/0337748 A1 | 11/2016 | Goksel | |
| 2017/0303034 A1 | 10/2017 | Sullivan | |

* cited by examiner

LOUDSPEAKER SYSTEM

CROSS-REFERENCE TO RELATED APPLICATIONS

This application claims the benefit of U.S. Provisional Patent Application No. 62/393,388, filed on Sep. 12, 2016, and titled "Loudspeaker System," the contents of which are incorporated herein by reference in their entirety.

BACKGROUND

This disclosure relates to a loudspeaker system used for multi-channel audio reproduction. Typical multi-channel audio reproduction systems may use satellite loudspeakers to reproduce left, left surround, right, and right surround channel signals. A separate center channel loudspeaker may be sued to reproduce a center channel signal, and a separate subwoofer may be used to reproduce low frequencies and an LFE channel signal if present. In typical multi-channel loudspeaker systems, the satellite loudspeakers and center channel signals each reproduce their own channel signal, and do not reproduce any portion of another channel signal. Left, left surround, right, right surround, and center channel loudspeakers reproduce the entire frequency range of left, left surround, right, right surround, and center channel signals respectively, except for low frequency portions which may be fed to a separate subwoofer. Such arrangements require the left, left surround, right, and right surround and center loudspeakers to be large enough to efficiently reproduce the full frequency range of signals provided to them.

SUMMARY

All examples and features mentioned below can be combined in any technically possible way.

In one aspect, a multimedia system includes a console configured to manage a plurality of media inputs and media outputs of the multimedia system and to provide audio content to a plurality of audio devices; first and second omnidirectional satellites coupled to the console, each satellite comprising a housing defining a total acoustic volume of less than 150 cu cm. The first satellite is configured for placement in a first region of a listening area and to reproduce audio frequencies from a first channel within a first frequency range, the first frequency range being above a first cutoff frequency. The second satellite is configured for placement in a second region of the listening area to reproduce audio frequencies from a second channel within the first frequency range. The system further includes a central loudspeaker array coupled to the console. The central loudspeaker array comprises a housing defining a total acoustic volume of less than about 350 cu in, where the central loudspeaker array is configured for placement in a third region of the listening area substantially located between the first and second satellites. The central loudspeaker array further comprises a plurality of audio transducers configured to reproduce audio frequencies from the first channel and the second channel within a second frequency range, the second frequency range being above about a second crossover frequency and below about the first crossover frequency range. The central loudspeaker array radiates the first channel signals in the second frequency range to the left of the general location of the central loudspeaker array and radiates the second channel signals in the second frequency range to the right of the general location of the central loudspeaker array. The central loudspeaker array is further configured to reproduce audio frequencies from a third channel within the first and second frequency ranges. The system further includes an omnidirectional bass module, such as a subwoofer, coupled to the console to reproduce audio in a fourth frequency range below about the second crossover frequency.

DETAILED DESCRIPTION

Figure 1:
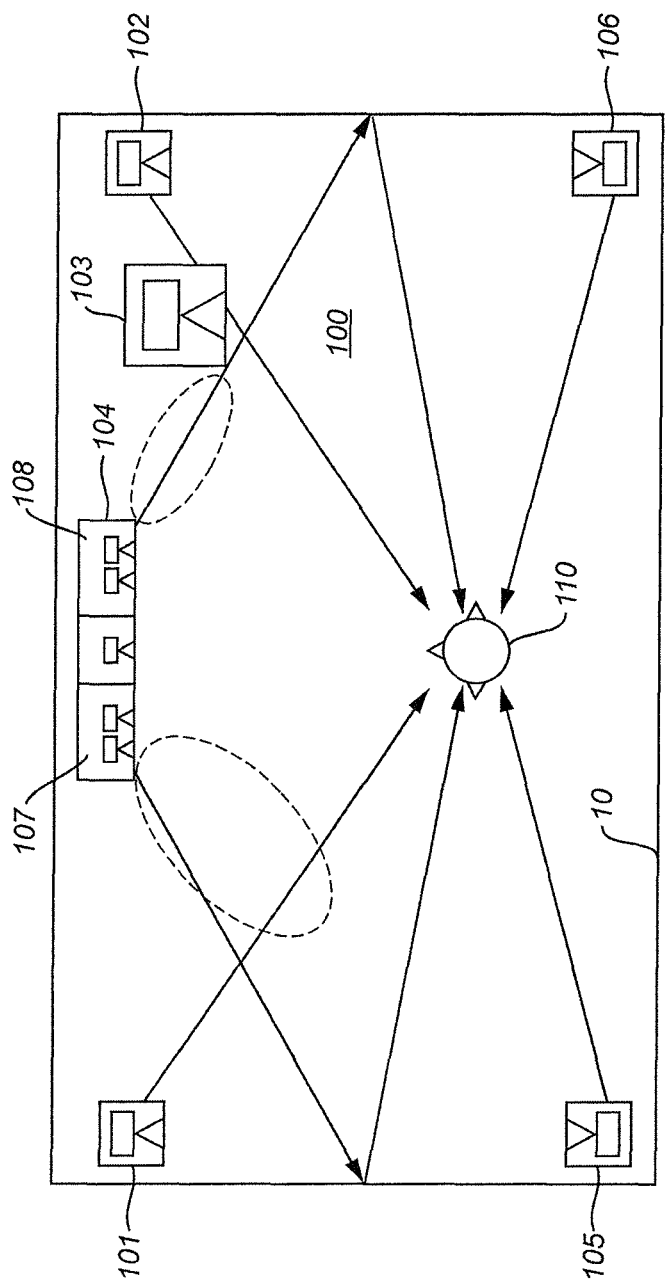
FIG. 1 shows a loudspeaker system located in a listening room.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. The order in which blocks appear can be re-arranged as long as the end result of the signal processing operations remains the same. Conventional audio signal processing equipment and operations are in some cases omitted from the drawing.

FIG. 1 depicts room 10 in which a loudspeaker system 100 is located. Loudspeaker system 100 consists of a first pair of satellite loudspeakers 101 and 102, a second pair of satellite loudspeakers 105 and 106, a subwoofer 103 (which may also be referred to as an omni-directional bass module), and a central loudspeaker array 104. While system 100 of FIG. 1 is depicted as having two pairs of satellite loudspeakers and a single subwoofer, loudspeaker systems with fewer or additional satellite loudspeakers and additional or no subwoofers are also possible and are contemplated herein. In one non-limiting example (not shown), satellite loudspeakers 105 and 106 are not present.

Satellite loudspeakers (101, 102, 105 and 106) are omnidirectional in one example. That is, the satellite loudspeakers of loudspeaker system 100 radiate sound energy approximately equally in all directions, over at least the majority of their operating frequency range. In one non-limiting example, omnidirectional satellite loudspeakers as described in U.S. patent application Ser. No. 14/643,216, titled, "Acoustic Deflector for Omni-Directional Speaker System," filed Mar. 10, 2015, which is herein incorporated by reference in its entirety, and as described in U.S. patent application Ser. No. 15/222,296, titled "Acoustic Deflector for Omni-Directional Speaker System", filed Jul. 28, 2016, herein incorporated by reference in its entirety, and U.S. patent application Ser. No. 15/221,906, titled "Omni-Directional Speaker System and Related Devices and Methods", filed Jul. 28, 2016, herein incorporated by reference in its entirety, are used as the satellite loudspeakers of system 100. The satellite loudspeakers 101, 102, 105, and 106 radiate energy onmidirectionally at least in the frequency range of 400 Hz to 2 kHz, and more preferable in the frequency range of 400 Hz to 4 kHz, and yet more preferably in the frequency range of 400 Hz to 8 kHz. In some examples, radiation above 8 kHz may also be omnidirectional if desired.

Satellite loudspeakers 101 and 102 are shown located in the front of room 10 such that they are in front of and to the left and right sides, respectively, of listener 110. Satellite loudspeakers 105 and 106 are shown located in the rear of room 10 such that they are behind and to the left and right sides, respectively, of listener 110. Satellite loudspeakers 105 and 106, if present, are typically used to reproduce surround sound content.

Subwoofer 103 is used to radiate low frequency acoustic energy into room 10. Subwoofer 103 generally also radiates acoustic energy omnidirectionally into room 10, though omnidirectional radiation for subwoofer 103 is not required. In one example, the upper frequency range of operation of subwoofer 103 is generally limited to be no higher than approximately 250 Hz. In one non-limiting example, the upper cut off frequency of subwoofer 103 is chosen to be 225 Hz, and the output is chosen to roll off above this cutoff frequency. The cutoff frequency is defined (for low pass and high pass responses) as the frequency where the filtered loudspeaker output has decreased by 3 dB relative to the midband filtered loudspeaker output. The exact cutoff frequency can be chosen by the system designer in conjunction with the order of the roll off based on a number of considerations. Typical low pass electrical (passive or active) filters applied in crossover networks used to filter signals applied to subwoofers may have a cutoff frequency anywhere between 80 Hz and 300 Hz or so, and may have orders anywhere from $1^{st}$ order to $8^{th}$ order (−6 dB per octave roll off per order) or higher.

The choice of cutoff frequency of a filtered subwoofer output affects the rest of the loudspeaker system elements, as well as various aspects of loudspeaker system performance. Energy that is not radiated by the subwoofer must be radiated by other system elements. The lower the cutoff frequency chosen for the subwoofer low pass response, the lower in frequency other system elements (e.g., the satellites speakers 101, 102, and the central loudspeaker array 104) must be capable of radiating. For a predetermined maximum system output level, in general, if the cutoff frequency of the subwoofer output is made lower, other system elements must grow in size. Therefore, to provide useful system output while keeping other system components small, a designer would choose to make the cutoff frequency of the subwoofer higher.

If the cutoff frequency for the subwoofer is pushed up too high in frequency, however, the subwoofer becomes localizable. That is, when the complete system is operating, a listener would be able to more easily determine where the subwoofer is located solely by listening. It is generally not desirable for the listener to be able to localize on the subwoofer. As the ability of the human auditory system to localize sound in rooms degrades at lower frequencies, limiting operation of subwoofer 103 to be below about 225 Hz reduces the chances it will be localizable.

In one non-limiting example, satellite loudspeakers that are part of a loudspeaker system are made much smaller than is typical. In one non-limiting example, satellite loudspeakers have an acoustic volume less than about 200 cubic cm. In one non-limiting example, satellite loudspeakers have an acoustic volume less than about 150 cubic cm. In one non-limiting example, satellite loudspeakers have an acoustic volume of about 112 cubic cm.

The acoustic volume of an enclosure is the total volume of air contained within the enclosure available for compression and rarefaction by operation of an electroacoustic transducer mounted to the enclosure. The acoustic volume can differ from the physical volume of the enclosure as structures may be located within the interior of the enclosure that displace compressible air and therefore do not contribute to the acoustic volume. For example, the hard parts of an electroacoustic transducer motor structure may sit inside to the enclosure and take up some physical space thus reducing the acoustic volume of the enclosure. Other components may be located within the enclosure such as an amplifier or other electronics further reducing the acoustic volume. For purposes of this disclosure and for ease of determination, the acoustic volume is defined to include the total volume of air contained within the acoustic enclosure, including the air volume contained within any port or waveguide structure that may be part of the enclosure.

To determine the acoustic volume of an enclosure, any leaks or openings should be sealed. For ports and waveguides, the far ends of the port or waveguide should be sealed so that the volume contained within the port or waveguide is included as part of the enclosure volume. To measure the acoustic volume, the small signal resonance frequency of the electroacoustic transducer used with the enclosure is first determined with the transducer mounted in free air. A second measurement of resonance frequency is then done with the transducer mounted in a test enclosure whose internal volume has been accurately measured. From these two measurements, the moving mass and compliance of the electroacoustic transducer can be determined. This method is known as the added compliance method of determining transducer parameters, and is well known in the art. The transducer is then removed from the test enclosure and mounted to the sealed enclosure of unknown acoustic volume (the product enclosure, sealed as described above). The product enclosure should contain any physical structures (such as amplifiers) that will be present in the end product. A third measurement of resonance frequency is then made, and the acoustic volume of the product enclosure can be determined from the third measurement and the known moving mass and compliance of the electroacoustic transducer that were determined previously. It should be noted here that there are a number of well-known methods for determining the small signal parameters of electroacoustic transducers, and other methods can be used besides the one presented here.

The smaller loudspeakers are constrained to radiate sound above a predetermined cutoff frequency. High pass filters (one for each satellite loudspeaker) are used to alter the output of the satellite speakers. In this example, the cutoff frequency is chosen to be 400 Hz. The cutoff frequency of the satellite loudspeaker high pass response is chosen to be higher than the cutoff frequency of the subwoofer output low pass response. In this example, the cutoff frequencies of the low pass and high pass loudspeaker responses are spaced approximately 1 octave apart. However, wider or narrower spacing of cutoff frequencies is also contemplated herein. In one non-limiting example, the spacing is chosen to be half an octave. In another non-limiting example, the spacing is chosen to be as much as two octaves.

When the cutoff frequencies of the low pass response of the subwoofer output and the high pass response of the satellite loudspeaker outputs are separated as described above, sound output by the loudspeaker system in the frequency range spanning between the cutoff frequencies will be attenuated relative to sound output from the loudspeaker system below the subwoofer low pass cutoff frequency and above the satellite loudspeaker high pass cutoff frequency. To account for this, sound in the frequency range between the cutoff frequencies needs to be reproduced by another loudspeaker element, other than the satellite speakers if the satellite speakers are to remain small and not the subwoofer if the subwoofer is to remain non-localizable.

Central array 104 functions in part as this additional speaker. Since it is separate from satellite loudspeakers 101, 102, 105 and 106, the satellite loudspeakers can remain small. Central array 104 is configured to directionally radiate to the left side of room 10 (to reflect off walls of room 10 to the left of listener 110) left and left surround channel signals, in the frequency range spanning between the low pass cutoff frequency of the subwoofer 103 and the high pass cutoff frequency of the satellite loudspeakers, so that listener 110 would perceive these sound as if they had been radiated by loudspeaker elements located on the left side of the room. Central array 104 is also configured to directionally radiate to the right side of room 10 (to reflect off walls of room 10 to the right of listener 110) right and right surround channel signals, in the frequency range spanning between the low pass subwoofer cutoff frequency and the high pass cut off frequency of the satellite loudspeakers, so that listener 110 would perceive these sounds as if they were radiated by loudspeaker elements located on the right side of the room.

Central loudspeaker array 104 includes at least a pair of audio transducers mounted in an acoustic enclosure. In one non-limiting example, central loudspeaker array 104 consists of two pairs of electroacoustic transducers used for radiating lower and mid frequency range acoustic energy, and a separate electroacoustic transducer used to radiate high frequency acoustic energy, where the acoustic enclosure has a total acoustic volume of about 350 cu cm. In one non-limiting example depicted in FIG. 1, first and second pairs of electroacoustic transducers are coupled to first and second sealed back enclosures 107 and 108. In one non-limiting example, the first and second pairs of electroacoustic transducers are coupled to first and second acoustic waveguide back enclosures, each waveguide back enclosure independent from the other, to aid in low frequency reproduction. Other back enclosure types are also contemplated herein, such as vented and sealed enclosures. Any known back enclosure type may be used to load the pairs of electroacoustic transducers.

Electrical audio signals provided to the two pairs of transducers are processed and provided to the individual transducer elements to achieve desired radiation patterns. The signal processing applied to central loudspeaker array 104 is described in more detail below with respect to FIG. 2 where the loudspeaker system 100 signal processing block diagram is depicted. While central loudspeaker array 104 is depicted as having first and second pairs of low/mid frequency transducer elements, additional elements may be used to provide additional degrees of freedom in the radiation patterns obtained. Systems with additional transducer elements (5, 6, 7, for example) incorporated in to the central loudspeaker array are contemplated herein.

Figure 2:
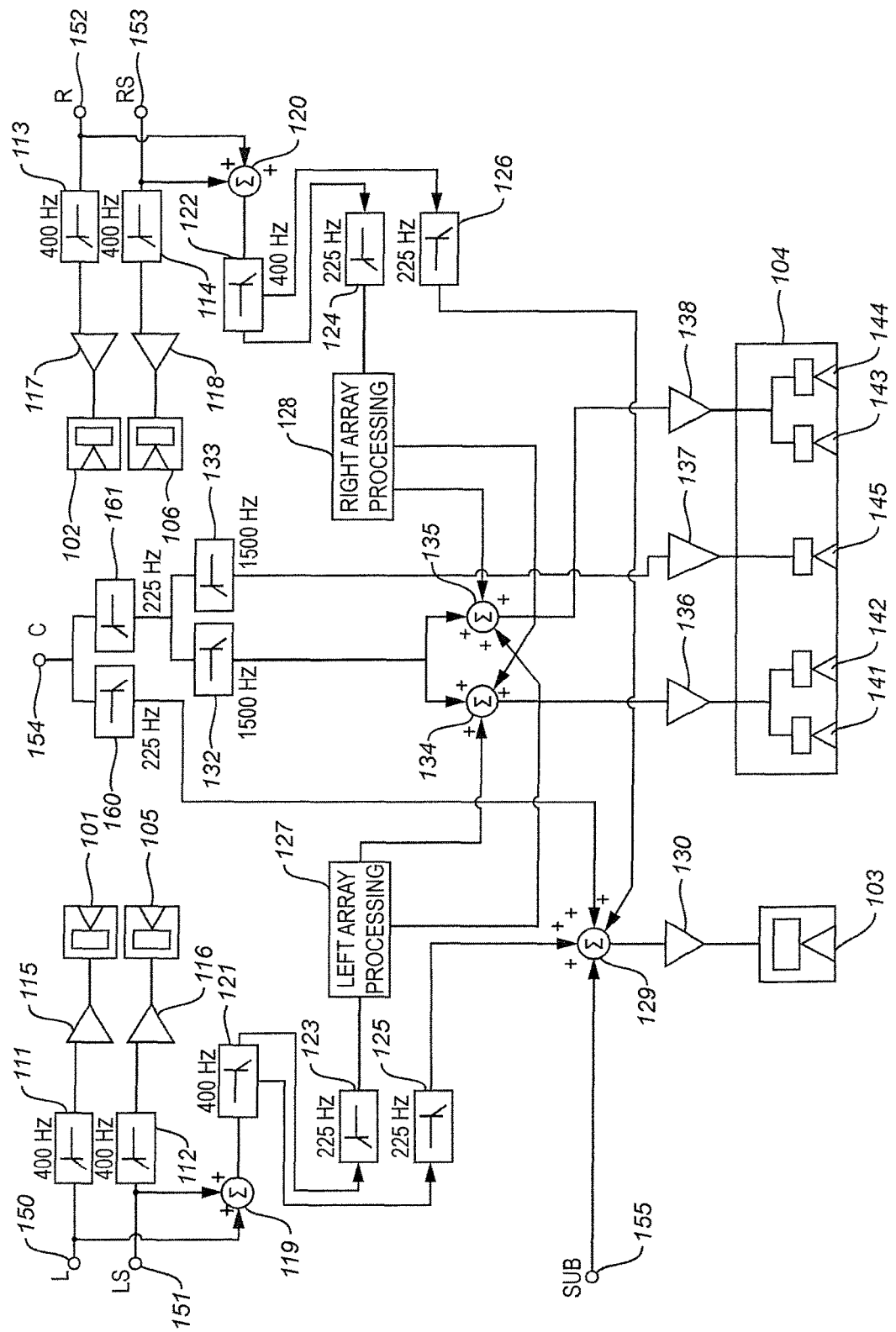
FIG. 2 is a block diagram of the signal processing used with the loudspeaker system of FIG. 1.

Now turning to FIG. 2, a block diagram of system 100 of FIG. 1 depicting left, left surround, right, right surround, and center channel signal processing, satellite loudspeakers 101, 102, 105, 106, subwoofer 103 and central loudspeaker array 104 is provided. FIG. 2 shows a system where 5.1 input signals are available (left, left surround, right, right surround, center and sub (the 0.1 channel)). These signals may be provided as part of a multi-channel surround sound system (such as a 5.1 multi-channel system), or may be derived from an upmixing algorithm that extracts the 5.1 channels from fewer (typically a stereo pair of) input channels. Upmixing algorithms are well known in the art, and the system can work with any known upmixing algorithm (NEO 6, Neural, Pro Logic, Pro Logic II, Circle surround, etc.) available from companies such as DTS, Dolby, SRS and the like.

System 100 operates as follows. Left input 150 is filtered by high pass filter 111, amplified by amplifier 115 and provided to left satellite loudspeaker 101. Left surround input 151 is filtered by high pass filter 112, amplified by amplifier 116 and provided to left surround satellite loudspeaker 105. Right input 152 is filtered by high pass filter 113, amplified by amplifier 117 and provided to right satellite loudspeaker 102. Right surround input 153 is filtered by high pass filter 114, amplified by amplifier 118 and provided to right surround satellite loudspeaker 106. High pass filters 111, 112, 113, and 114 are chosen to have the same cutoff frequency (which in the example of FIG. 2 is chosen to be 400 Hz), however, this is not strictly required. For example, a designer could choose the output cutoff frequency of surround satellite loudspeakers 105 and 106 to be higher or lower in frequency than the output cutoff frequency of front satellite loudspeakers 101 and 102, while ensuring that the high pass responses of the front and rear satellite loudspeakers had cutoff frequencies above the low pass output cutoff frequency of subwoofer 103. In one non-limiting example, the cutoff frequency of surround satellite loudspeakers 105 and 106 is chosen to be 1.5 octaves above the subwoofer 103 output cutoff frequency, while front satellite loudspeakers 101 and 102 are chosen to have their cutoff frequencies only one octave above the subwoofer 103 cutoff frequency. This allows the surround satellite loudspeakers to be made even smaller than the front satellite loudspeakers if desired.

Left input 150 and left surround input 151 are summed together in summer 119. The output of summer 119 is low pass filtered by filter 121. The output of filter 121 is split into two paths. In the first path the output of filter 121 is provided to high pass filter 123. In the second path, the 2nd output from filter 121 is provided to low pass filter 125. The cutoff frequency of filter 121 typically is chosen to be complimentary to the cutoff frequency of high pass filters 111 and 112. In the example of FIG. 2, these cutoff frequencies are chosen to be 400 Hz. The cutoff frequencies of filters 123 and 125 are also typically chosen to be complimentary to each other. In this example, these cutoff frequencies are chosen to be 225 Hz.

Right input 152 and right surround input 153 are summed together in summer 120. The output of summer 120 is low pass filtered by filter 122. The output of filter 122 is split into two paths. In the first path, the output of filter 122 is provided to high pass filter 124. In the second path, the 2nd output from filter 122 is provided to low pass filter 126. The cutoff frequency of filter 122 typically is chosen to be complimentary to the cutoff frequency of high pass filters 113 and 114. In the example of FIG. 2, these cutoff frequencies are chosen to be 400 Hz. The cutoff frequencies of filters 124 and 126 are also typically chosen to be complimentary to each other. In this example, these cutoff frequencies are chosen to be 225 Hz.

The outputs of low pass filters 125 and 126 are input to summer 129. A low frequency signal 155 (an LFE signal in a surround sound system or a separate sub signal to be provided to a low frequency loudspeaker) is also input to summer 129. A center channel signal 154 is filtered by low pass filter 160, and this filtered center channel signal is also provided as an input to summer 129. The output of summer 129 is amplified by amplifier 130 and provided to subwoofer 103.

Center channel signal 154 is filtered by high pass 161. High pass filter 161 is chosen to have a cutoff frequency complimentary to the cutoff frequency of low pass filter 160. In the example of FIG. 2, the cutoff frequencies of low pass filter 160 and high pass filter 161 are chosen to be 225 Hz. The output of high pass filter 161 is split into two signal paths. The first output from high pass filter 161 is provided to high pass filter 133. The output of high pass filter 133 is amplified by amplifier 137 and provided to high frequency electroacoustic transducer 145, which is part of central loudspeaker array 104. The second output from high pass filter 161 is provided to low pass filter 132. The cutoff frequencies of high pass filter 133 and low pass filter 132 are chosen to be complimentary to each other. In the example of FIG. 2, the cutoff frequencies of high pass filter 133 and low pass filter 132 are chosen to be 1500 Hz.

The filtered center channel signal output from low pass filter 132 is provided simultaneously to summers 134 and 135. Additional inputs to summers 134 and 135 are described below. The outputs of summers 134 and 135 are amplified by amplifiers 136 and 138 respectively. The output of amplifier 136 is provided to electroacoustic transducers 141 and 142. The output of amplifier 138 is provided to electroacoustic transducers 143 and 144. Electroacoustic transducers 141, 142, 143, and 155 are part of central loudspeaker array 104. Center loudspeaker array 104 outputs the center channel signal above 225 Hz (the cutoff frequency of high pass filter 161), where signal from 225 Hz to 1500 Hz is output by electroacoustic transducers 141, 142, 143, and 144, and center channel signal above 1500 Hz is output by high frequency electroacoustic transducer 145. The center channel signal below 225 Hz is output by subwoofer 103.

Additional inputs to summers 134 and 135 are provided from left array processing 127 and right array processing 128, and operate as follows. Low pass filter 121 and high pass filter 123 provide a bandpass filtered combination of left channel signal 150 and left surround channel signal 151 to left array processing 127. In the example of FIG. 2, the frequency band between 225 Hz and 400 Hz of the combination of left channel signal 150 and left surround channel signal 151 is provided to left array processing 127.

Low pass filter 122 and high pass filter 124 provide a bandpass filtered combination of right channel signal 152 and right surround channel signal 153 to right array processing 128. In the example of FIG. 2, the frequency band between 225 Hz and 400 Hz of the combination of right channel signal 152 and right surround channel signal 153 is provided to right array processing 128.

Left array processing 127 processes the bandpass filtered left and left surround channel input signals into a pair of output signals to be provided to summers 134 and 135. Since summer 134 provides a signal via amplifier 136 to electroacoustic transducers 141 and 142, one of the outputs of left array processing 127 is effectively provided to electroacoustic transducers 141 and 142. The other output of left array processing 127 is provided to summer 135. Since summer 135 provides a signal via amplifier 138 to electroacoustic transducers 143 and 144, the second of the outputs of left array processing 127 is effectively provided to electroacoustic transducers 143 and 144.

Right array processing 128 processes the bandpass filtered right and right surround channel input signals into a pair of output signals to be provided to summers 134 and 135. Since summer 134 provides a signal via amplifier 136 to electroacoustic transducers 141 and 142, one of the outputs of right array processing 128 is effectively provided to electroacoustic transducers 141 and 142. The other output of right array processing 127 is provided to summer 135. Since summer 135 provides a signal via amplifier 138 to electroacoustic transducers 143 and 144, the second of the outputs of right array processing 128 is effectively provided to electroacoustic transducers 143 and 144.

Left array processing block 127 creates signals to be applied to transducers 141, 142, 143, and 144 in order to cause the output of center loudspeaker array 104 to be radiated to the left of central loudspeaker array 104. That is, left array processing 127 steers radiation of the filtered combined left and left surround signal (where the filtering is bandpass in nature and passes the frequency band between the corner frequency of high pass filter 123 and the corner frequency low pass filter 121, which in the example of FIG. 2 is the frequency band between 225 Hz and 400 Hz) to the left of the location of central loudspeaker array 104.

Right array processing block 128 creates signals to be applied to transducers 141, 142, 143, and 144 in order to cause the output of central loudspeaker array 104 to be radiated to the right of central loudspeaker array 104. That is, right array processing 128 steers radiation of the filtered combined right and right surround signal (where the filtering is bandpass in nature and passes the frequency band between the corner frequency of high pass filter 124 and the corner frequency low pass filter 122, which in the example of FIG. 2 is the frequency band between 225 Hz and 400 Hz) to the right of the location of central loudspeaker array 104. The radiation of right and right surround band limited signals to the right of central loudspeaker array 104 can be done simultaneously with the radiation of left and left surround band limited signals to the left of central array loudspeaker 104.

Use of array processing to steer the radiated output of a loudspeaker consisting of a number of independently addressable transducer elements is well known in the art, and will not be described in detail here. Central loudspeaker array 104 has two independently addressable "groups" of transducer elements (electroacoustic transducers 141 and 142 from a first group, and electroacoustic transducers 143 and 144 tot in a second group). By varying the magnitude and phase (and/or time delay) of signals provided to each group, the radiation pattern of center loudspeaker array 104 can be controlled. It should be understood that all electroacoustic transducer elements shown in FIG. 2 in central array loudspeaker 104 could be made independently addressable if desired. The benefit would be increased control over the directional pattern achieved, at the cost of more complex array signal processing (faulting 4 separate signals instead of two), and the additional of two additional amplifier channels. When only a pair if independently driven transducer elements are available, radiation patterns are generally limited to be first order gradient patterns (where at most a pair of nulls in the radiation pattern are generated), for frequencies below the frequency whose wavelength is 2×the spacing between elements. Methods to form first order gradient radiation patterns are well known and for example are fully described in U.S. Pat. No. 5,870,484, titled "Loudspeaker Array with Signal Dependent Radiation Pattern," filed Sep. 5, 1996, and which is herein incorporated by reference in its entirety.

The arrangement of loudspeaker elements in loudspeaker system 100 and the frequency ranges over which they operate are chosen to allow satellite speakers to be made substantially smaller than is traditional without sacrificing system localization performance. Frequencies below a chosen cut off frequency (which is 225 Hz in the example of FIG. 2 but can be below any corner frequency chosen to be in the region between about 150 Hz to 250 Hz) are radiated by a separate subwoofer. While a cutoff frequency below 150 Hz could be chosen, choosing a cutoff frequency below 150 Hz necessarily causes the sizes of other system components to increase in size beyond what is desirable. The first decade above this chosen cutoff frequency is critical for localization, as in this frequency range (from about 200 Hz to about 2 kHz) is the frequency range where inter-aural phase cues (which are the dominant localization cues) are used by the auditory system for determination of localization. Loudspeaker system 100 splits off only the lower one or to octaves of this critical localization frequency range and radiates them from a central loudspeaker array, instead of left and right located satellite loudspeakers (in front of and behind a listener if surround satellite loudspeakers are also present). By only radiating the lower one or two octaves of left and right channel signals (and left and right surround signals if present) from a central array out to left and right sides of a listening room respectively, when these signals are combined with the output from satellite loudspeakers spaced out to the left and right sides of the listening area radiating the rest of the important localization frequency range, the combined outputs from the center array and the satellites are perceived as if the complete left and right signals were radiated from the left and right satellites. By avoiding radiation of higher frequency portions of left channel, left surround channel, right channel, and right surround channel signals from the central array loudspeaker, the chance that left or right sided signals would be localized to the central array loudspeaker is minimized.

Loudspeaker system 100 may include a separate multimedia console which contains some or all of the electronics and signal processing of FIG. 2. The multimedia console may also contain an I/O interface for making connections to and from the multi-media console to other multi-media components (such as TV's, DVD players, set top boxes, game consoles and the like). The multi-media console may also contain a wireless interface for accepting commands and/or communicating data to other components (such as a remote wireless loudspeaker) or from other components such as a remote control, and MP3 player, a smartphone, a computer or the like. Some or all of center array loudspeaker 104, satellite loudspeakers 101, 102, 105, and 106, and subwoofer 103 may be coupled to the multi-media console.

Alternatively, some or all of the system electronics, I/O and wireless interface (if present) may be included in the loudspeaker enclosure of central array loudspeaker 104. Subwoofer 103 may include a low frequency electroacoustic transducer mounted into a loudspeaker enclosure. The subwoofer may be coupled to the electronics contained within the central array loudspeaker enclosure. The subwoofer loudspeaker enclosure may incorporate electronics associated with the subwoofer, such as amplifier 130. It should be understood that other partitioning of system components is also possible, and system 100 is not limited in where various electronic components of the system may be located.

Figure 3A:
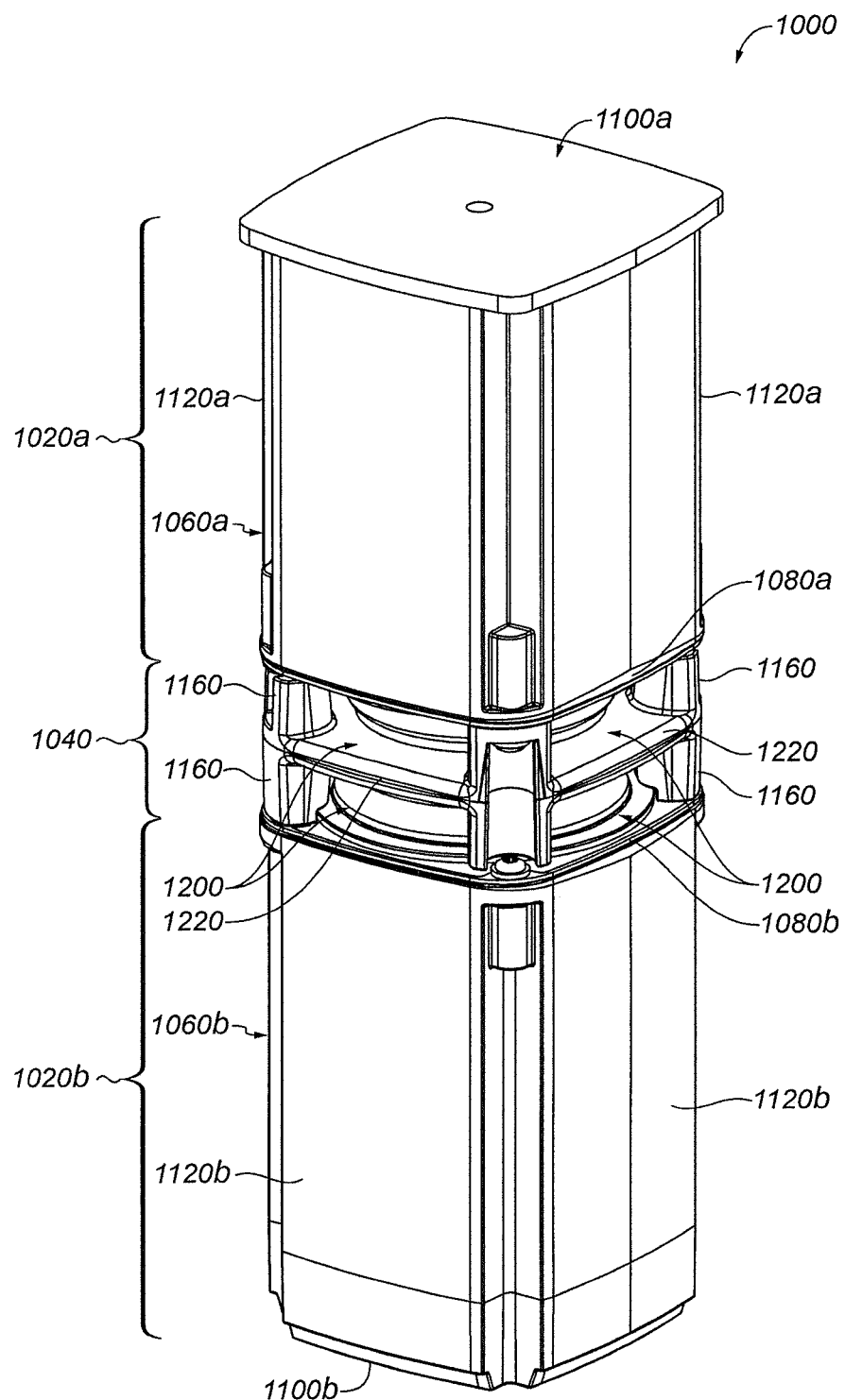
FIG. 3A is a perspective view of one example of an omni-directional satellite loudspeaker.
Figure 3B:
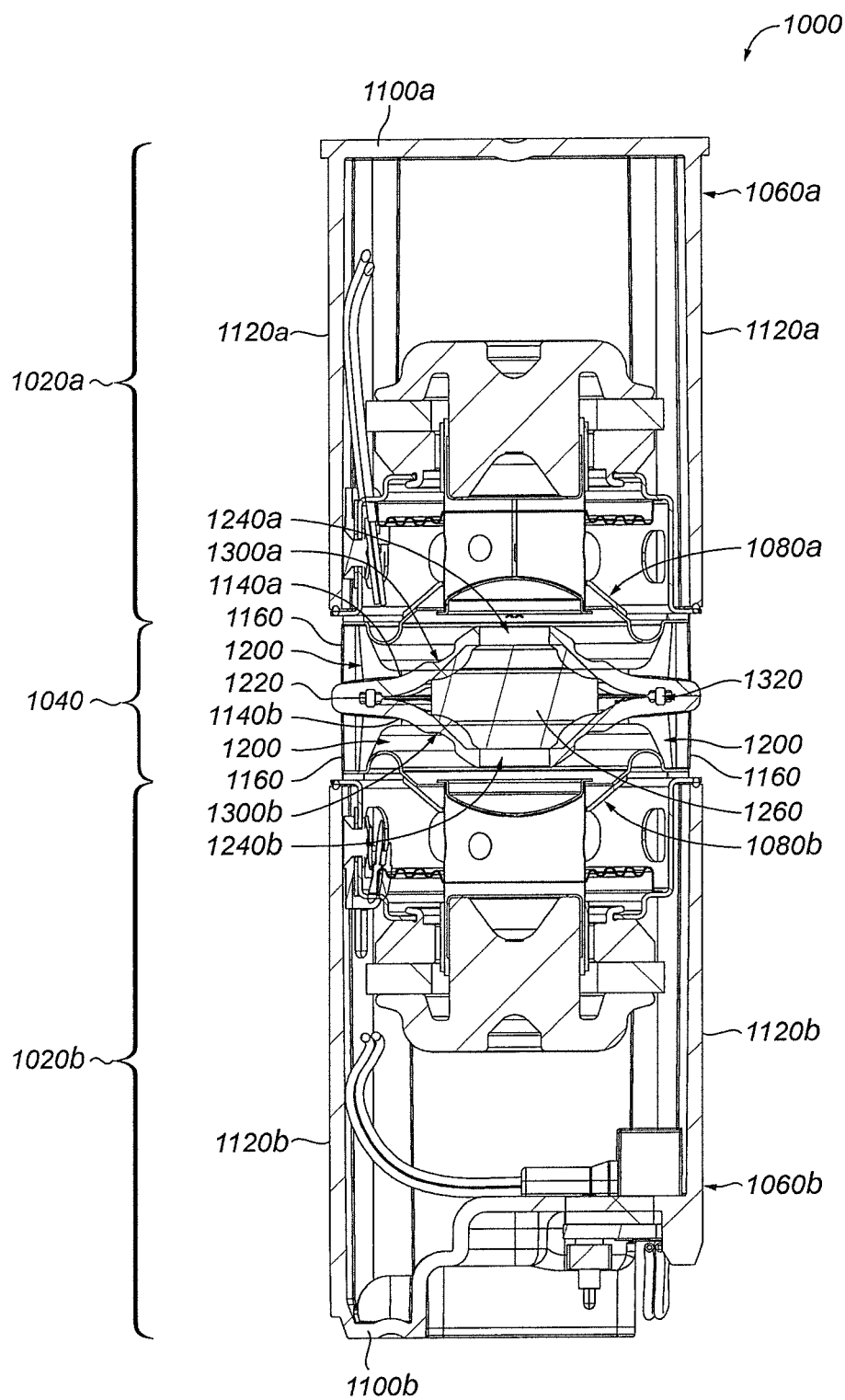
FIG. 3B is a cross sectional view of one example of an omni-directional satellite loudspeaker.

FIGS. 3A and 3B are perspective and cross-sectional views, respectively, of an acoustic assembly 1000 for an omni-directional speaker system. The assembly 1000 is a non-limiting example of one or more of the satellite loudspeakers 101, 102, 105 and 106, described herein with reference to FIGS. 1 and 2. The acoustic assembly includes a pair of diametrically opposing acoustic sub-assemblies 1020a, 1020b (collectively referenced as 1020), which are coupled together via a common deflector sub-assembly 1040. Each of the acoustic sub-assemblies 1020 includes an acoustic enclosure 1060a, 1060b (collectively referenced as 1060) and an acoustic driver 1080a, 1080b (collectively referenced as 1080).

Each acoustic enclosure 1080 includes a base 1100a, 1100b (collectively referenced as 1100) and a plurality of sidewalls 1120a, 1120b, (collectively referenced as 1120) which extend from the base to an opposing, open end. The associated acoustic driver 1080 is secured to the open end such that a rear radiating surface of the driver radiates acoustic energy into the acoustic enclosure 1060, and such that acoustic energy radiated from an opposing, front radiating surface of the acoustic driver 1080 propagates toward the deflector sub-assembly 1040.

The deflector sub-assembly includes 1040 a pair of diametrically opposing omni-directional acoustic deflectors 1140a, 1140b (collectively 1140). Each of the acoustic deflectors 1140 has four vertical legs 1160 to which a corresponding one of the acoustic sub-assemblies 1020 is mounted. The acoustic sub-assemblies 1020 are mounted such that the motion axes of their respective acoustic drivers 1080 are coaxial.

Acoustic energy generated by the acoustic drivers 1080 propagates toward the deflector sub-assembly 1040 and is deflected into a nominal horizontal direction (i.e., a direction substantially normal to the motion axes of the acoustic drivers 1080), by respective substantially conical outer surfaces of the acoustic deflectors 1140. There are eight substantially rectangular openings 1200. Each opening 1200 is defined by one of the acoustic sub-assemblies, a base 1220 of the deflector sub-assembly 1040, and a pair of the vertical legs 1160. These eight openings 1200 are acoustic apertures which pass the horizontally propagating acoustic energy. It should be understood that the propagation of the acoustic energy in a given direction includes a spreading of the propagating acoustic energy, for example, due to diffraction.

As shown in FIG. 3B, each of the acoustic deflectors 1140 has a nominally truncated conical shape. In other examples, the respective slopes of the conical outer surfaces, between the base and the vertex of the cone, are not constant. For example, one or both of the outer surfaces of the acoustic deflectors 1140 may have a non-linear slant profile such as a parabolic profile or a profile described by a truncated hyperboloid of revolution. The bodies of the acoustic deflectors 1140 can be made of any suitably acoustically reflective material. For example, the bodies may be formed from plastic, stone, metal, or other rigid materials.

In the illustrated example, each of the omni-directional acoustic deflectors 1140 includes two features which may contribute to an improvement of the acoustic spectrum. First, there are acoustically absorbing regions disposed along the acoustically reflecting surface. As shown in FIG. 3B, each of these regions is arranged at an opening 1240a, 1240b (collectively 1240), centered on the cone axis at the top of the truncated cone of the corresponding one of the acoustic deflectors 1140, in which acoustically absorbing material 1260 is disposed. This acoustically absorbing material 1260 attenuates the energy present near or at the peak of the lowest order circularly symmetric resonance mode. In some implementations, the respective diameters of the openings 1260 are chosen so that the resulting attenuation of the acoustic energy by the acoustic drivers 1080 is limited to an acceptable level while achieving a desired level of smoothing of the acoustic spectrum.

In the illustrated implantation, the acoustically absorbing material 1260 is foam (e.g., melamine foam). Notably, the bodies of the acoustic deflectors 1140 together form a common body cavity 1280 (a/k/a acoustic chamber), which, in the illustrated example, is filled with a single volume of foam such that the foam is adjacent to, or extends into, the openings. Alternatively, a separate foam element may be disposed at each opening so that only a portion of the body cavity 1280 is occupied by foam. In one implementation, the foam present at each of the central openings 1240 is at one end of a cylindrically-shaped foam element disposed within the body cavity 1280. In some cases, the foam element is oversized and is compressed between the bodies of the acoustic deflectors 1140 to achieve the desired acoustic properties (e.g., the desired acoustic absorptivity).

The body cavity 1280, together with the openings 1240, serves as a Helmholtz resonator (i.e., a shared, or dual, Helmholtz resonator) for attenuating a certain acoustic mode. By combining the volume between the two acoustic deflectors, there is more volume to work with in terms of trapping of the energy making the Helmholtz resonator work. So sharing a common acoustic chamber effectively increases the volume that is available to each one of the deflectors individually, thereby increasing the amount of volume to kill the acoustic mode.

The second feature of the acoustic deflectors 1140 that may contribute to an improvement in the acoustic spectrum is the presence of recesses 1300a, 1300b (a/k/a collectively 1300), shown as ring shaped troughs, located along the circumferences of the nominally conical outer surfaces. In one example, the recesses 1300 are each arranged at a circumference at a peak of the second harmonic of the resonance mode. In another example, one or both of the recesses 1300 may be arranged at a radius that is approximately one-half of the base radius of the cone.

Alternatively or additionally, the recesses 1300 may correspond with/to features of the acoustic driver. That is the recesses may be included to accommodate movement of features of the acoustic driver (e.g., movement of a diaphragm of the acoustic driver) relative to the omni-directional acoustic deflectors.

FIGS. 4A through 4F illustrate a step-wise assembly of an omni-directional speaker system that includes the acoustic assembly 1000. Beginning with FIG. 4A, the bodies of the acoustic deflectors 1140 are brought together, e.g., in a welding operation, to define the body cavity 1280 (FIG. 3B) therebetween. In some examples, a hot plate welding procedure is employed to form a weld seam 1320 (FIG. 3B) that couples the deflector bodies together and acoustically seals the body cavity 1280 at the junction between the two deflector bodies. The weld seam 1320 may be formed by a rib (e.g., a plastic rib) that is heated during a hot plate welding operation. A cylindrical piece of acoustically absorbing material 1260 (e.g., foam) is disposed between the bodies and is compressed during the assembly operation to provide finished deflector sub-assembly 1020 with the desired acoustic absorbing property.

Figure 4A:
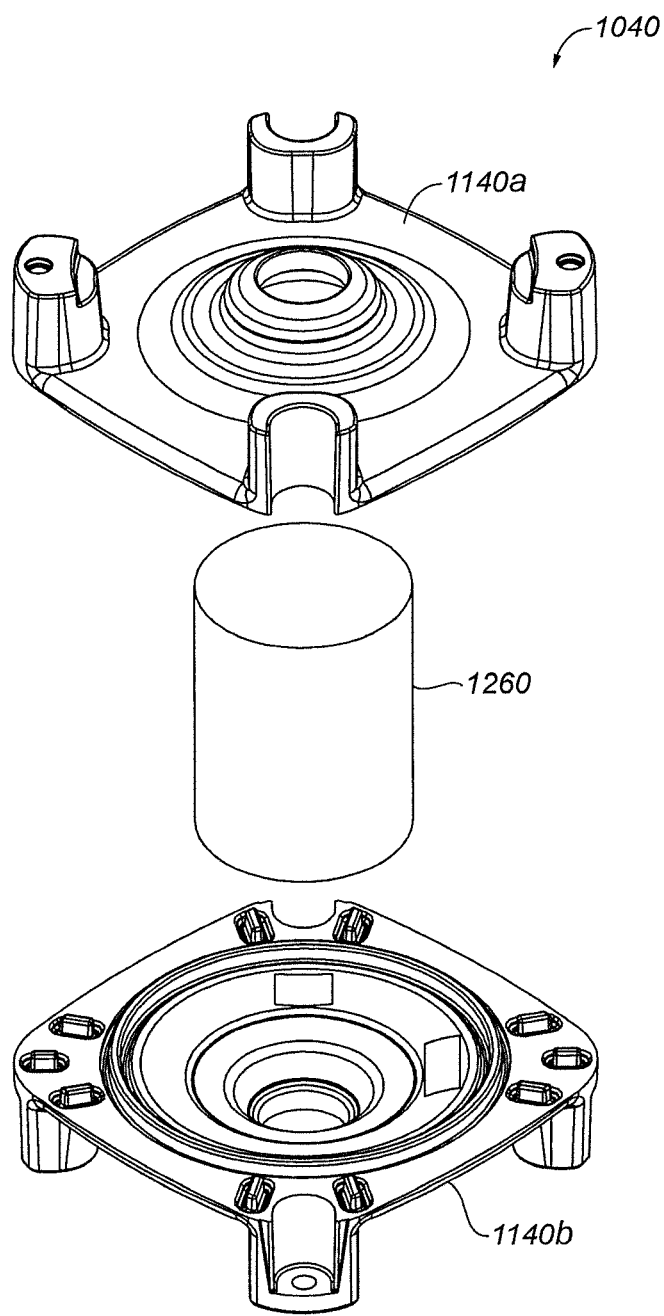
FIG. 4A shows an assembly step of one example of an omni-directional satellite loudspeaker.
Figure 4B:
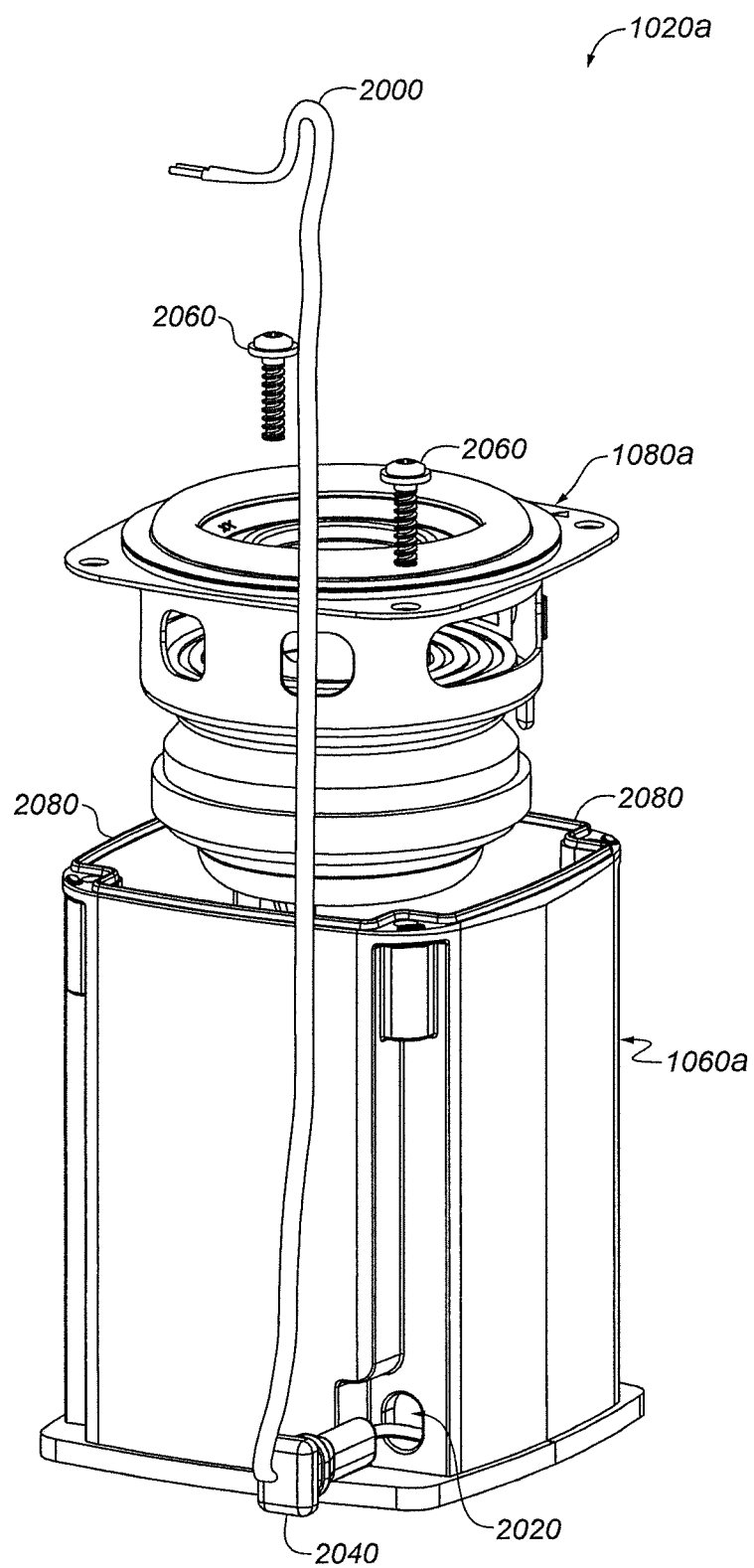
FIG. 4B shows another assembly step of one example of an omni-directional satellite loudspeaker.

FIG. 4B illustrates the assembly of the first acoustic sub-assembly 1020a. A first end of electrical wiring 2000 is passed through an aperture 2020 in the first acoustic enclosure 1060a, via a grommet 2040, and is connected to terminals (not shown) on the first acoustic driver 1080a. The electrical wiring 2000 provides electrical signals to the first acoustic driver 1080a for driving the first acoustic driver 1080a. The grommet 2040 helps to assure that the aperture 2020 in the first acoustic enclosure 1060a is acoustically sealed in the final assembly.

The first acoustic driver 1080a is then secured to the first acoustic enclosure 1060a via a pair of fasteners 2060 that pass through holes in a mounting bracket of the first acoustic driver 1080a and threadingly engage the first acoustic enclosure 1060a. In that regard, the fasteners 2060 may engage pre-formed threaded holes in the first acoustic enclosure 1060a, or they may form threaded holes as they engage the first acoustic enclosure 1060a. A peripheral gasket 2080 is provided at the open end of the first acoustic enclosure 1060a to help provide an acoustic seal at the junction between the first acoustic driver 1080a and the first acoustic enclosure 1060a. Assembly of the second acoustic sub-assembly 1020b (FIG. 3A) is substantially identical to that of the first acoustic sub-assembly 1020a, and, thus, is not described for the sake of conciseness.

Figure 4C:
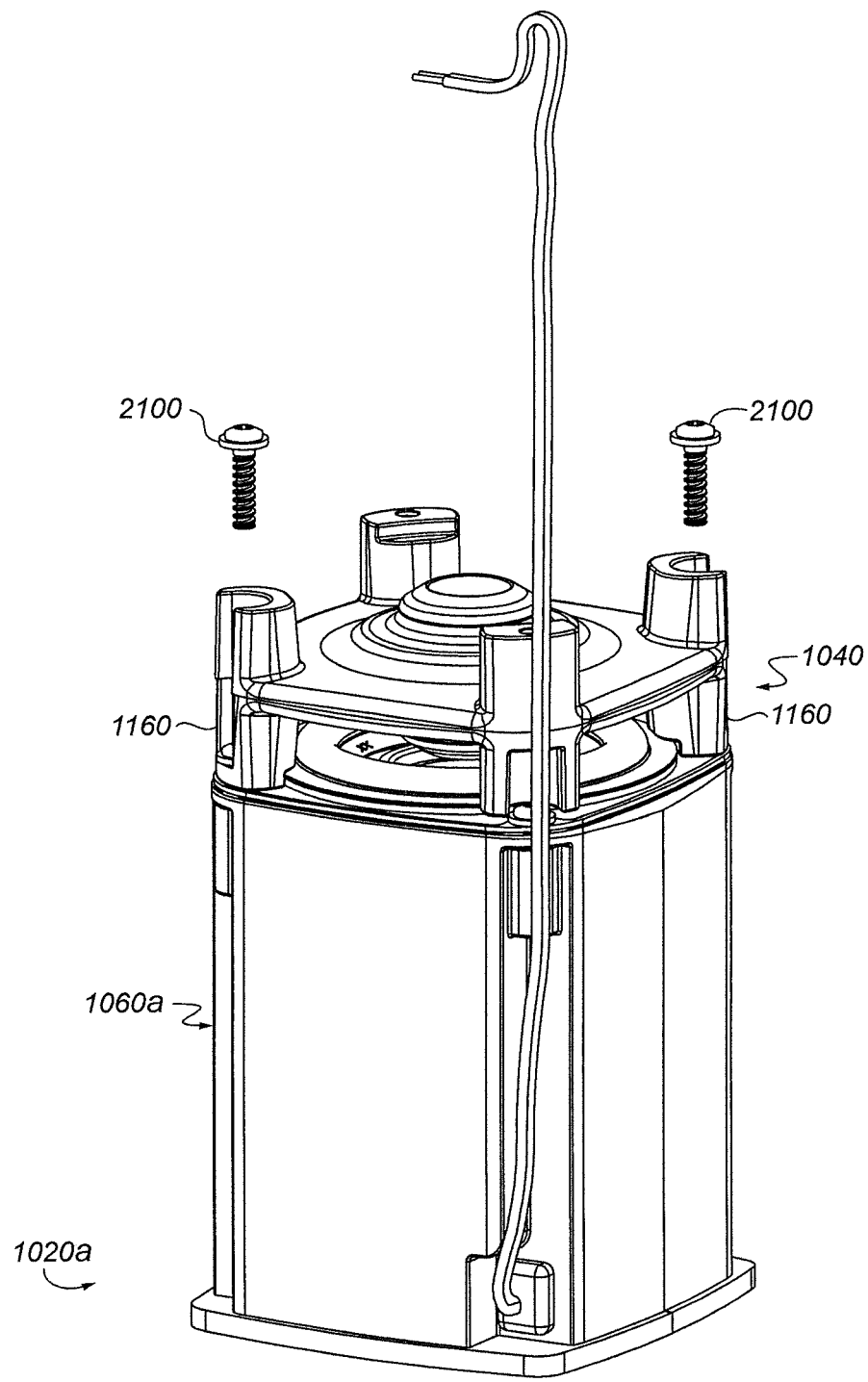
FIG. 4C shows another assembly step of one example of an omni-directional satellite loudspeaker.

Next, referring to FIG. 4C, the deflector sub-assembly 1040 is secured to the first acoustic sub-assembly 1020a via a pair of fasteners 2100 which pass through holes in a first pair of diametrically opposed ones of the vertical legs 1160, then pass through holes in the mounting bracket of the first acoustic driver 1080a, and then threadingly engage the first acoustic enclosure 1060a. In that regard, the fasteners 2100 may engage pre-formed threaded holes in the first acoustic enclosure 1060a, or they may form threaded holes as they engage the first acoustic enclosure 1060a. This completes the coupling of the deflector sub-assembly 1040 to the first acoustic sub-assembly 1020a and completes the acoustic seal at the junction between the first acoustic driver 1080a and the first acoustic enclosure 1060a.

Figure 4D:
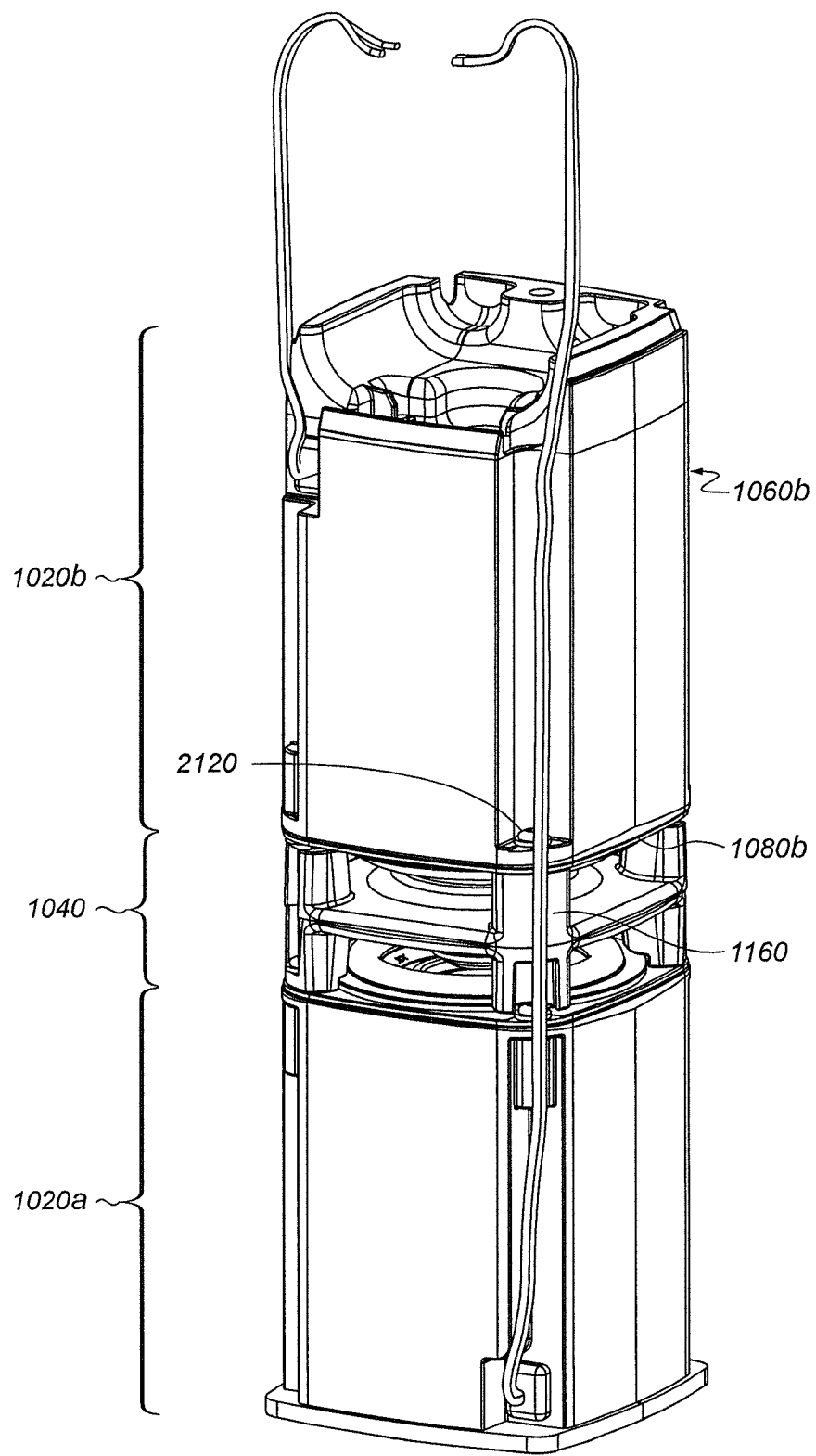
FIG. 4D shows another assembly step of one example of an omni-directional satellite loudspeaker.

Referring to FIG. 4D, once the deflector sub-assembly 1040 is fastened to the first acoustic sub-assembly 1020a, the second acoustic sub-assembly 1020b is coupled to the deflector sub-assembly 1040 via another pair of fasteners 2120 (one shown) which pass through holes in the second acoustic enclosure 1060b, then pass through holes in a mounting bracket of the second acoustic driver 1080b, and then threadingly engage a second pair of diametrically opposed ones of the vertical legs 1160. In that regard, the fasteners 2120 may engage pre-formed threaded holes in the vertical legs 1160, or they may form threaded holes as they engage the vertical legs 1160. This completes the coupling of the second acoustic sub-assembly 1020b to the deflector sub-assembly 1040 and completes the acoustic seal at the junction between the second acoustic driver 1080*b* and the second acoustic enclosure 1060*b*. Coupling the acoustic sub-assemblies 1020 through the deflector sub-assembly 1040 in this manner can help to eliminate the need for visible fasteners in the finished assembly.

Figure 4E:
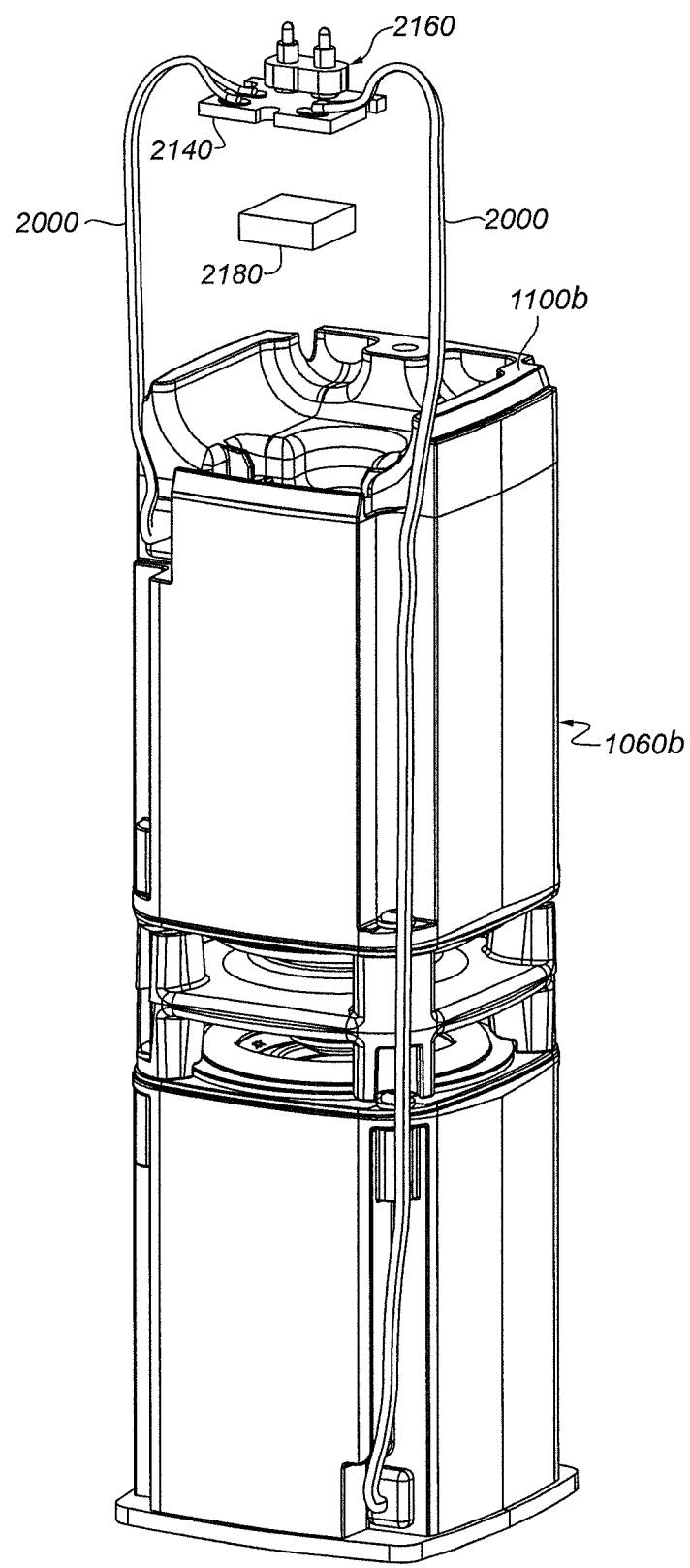
FIG. 4E shows another assembly step of one example of an omni-directional satellite loudspeaker.

With reference to FIG. 4E, the second, free ends of the electrical wiring 2000 for the acoustic drivers are attached to a printed wiring board (PWB 2140), which also supports an electrical connector 216 for providing external electrical connection (e.g., to a source of audio signals (not shown)). The PWB 2140 is arranged adjacent to the base 1100*b* of the second acoustic enclosure 1060*b*. A compliant member 218 (e.g., a piece of foam) is disposed between the base 1100*b* of the second acoustic enclosure 1060*b* and the PWB 2140. As described below, the compliant member 2180 serves to bias the PWB 2140 against an end cap (item 2300*b*, FIG. 4F) in the finished assembly.

Figure 4F:
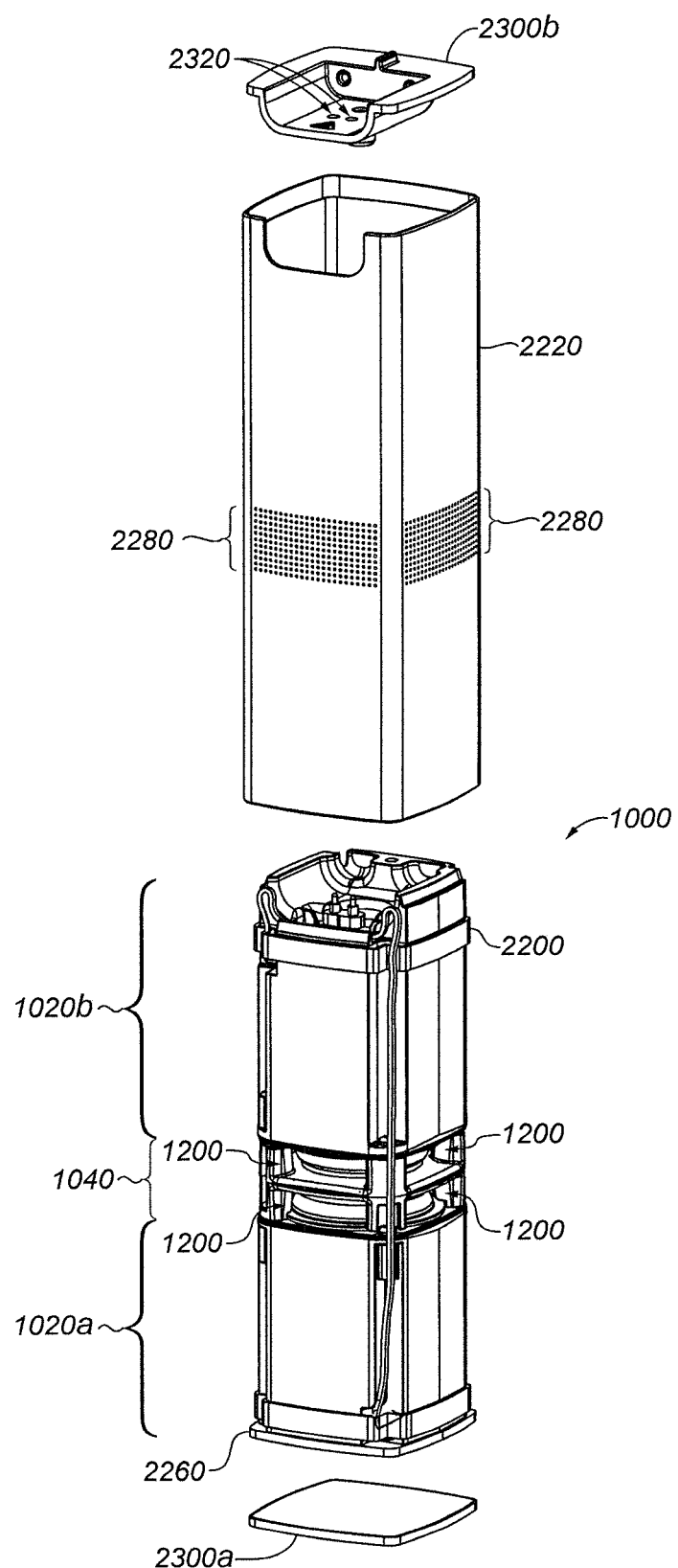
FIG. 4F shows another assembly step of one example of an omni-directional satellite loudspeaker.
Figure 5:
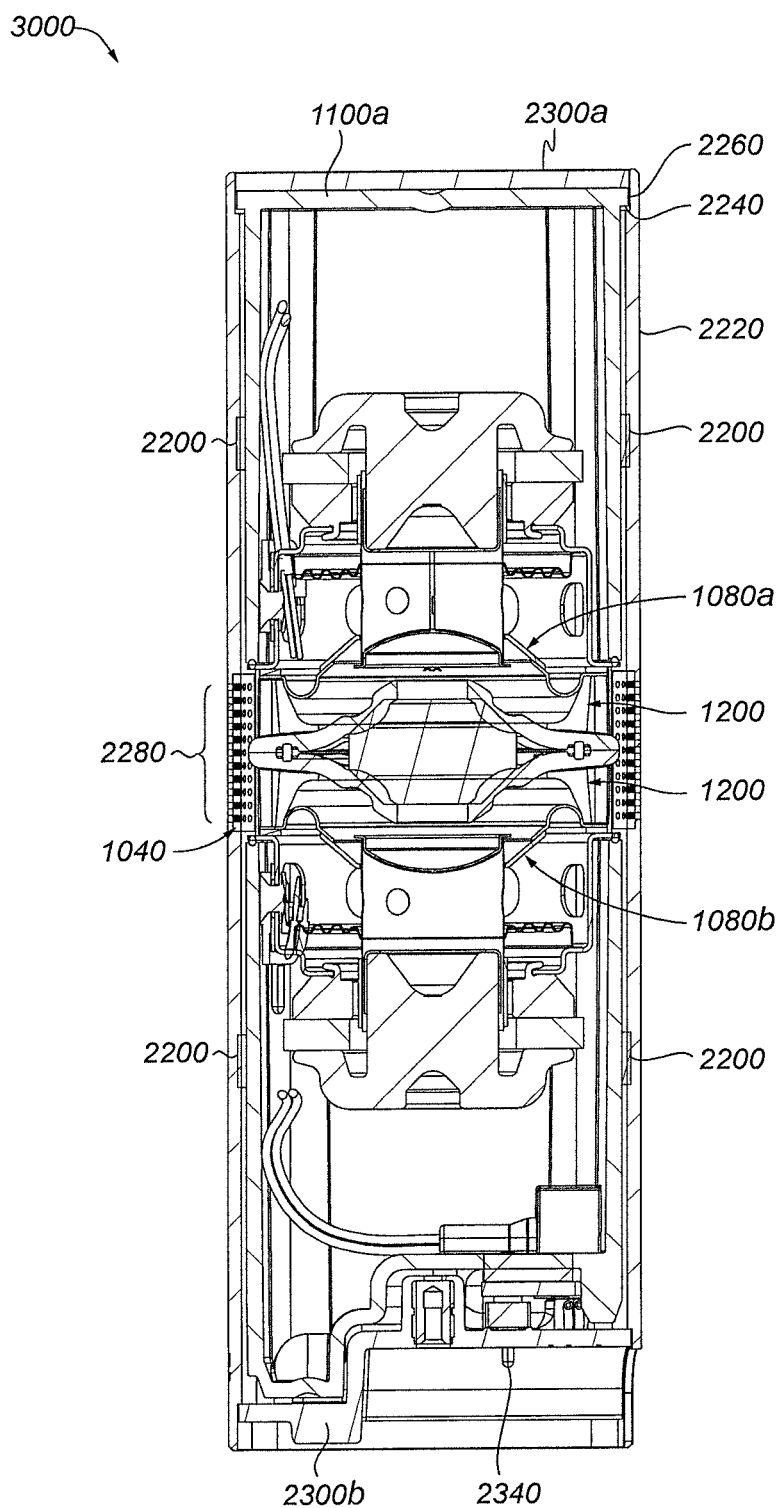
FIG. 5 is a cross sectional view of one example of an omni-directional satellite loudspeaker.

Referring to FIGS. 4F and 5, a band of vibration absorbing material 2200 is wrapped around each of the acoustic sub-assemblies 1020, and then a hollow outer sleeve 2220 is slid over the acoustic assembly 1000. The sleeve 2220 is slid over the acoustic assembly from the second acoustic sub-assembly 1020*b* toward the first acoustic sub-assembly 1020*a*, such that a first recess 2240 (FIG. 5) formed at a first open end of the sleeve 2220 comes to rest above a lip 2260 formed around the base 1100*a* of the first acoustic enclosure 1060*a*. In that regard, the lip 2260 is only used as a hard stop for drop—there is a gap for buzz prevention. The sleeve 2220 may be formed from a rigid material, such as plastic or metal (e.g., aluminum), and includes regions 2280 of perforations which align with the openings 1200 in the acoustic assembly 1000 to permit the passage of the acoustic energy that is radiated from the acoustic drivers 1080 and deflected by the deflector sub-assembly 1040. The vibration absorbing material 2200 helps to inhibit buzzing (undesirable noise) that may otherwise be caused by relative movement of the acoustic assembly 1000 and the sleeve 2220 during operation of the omni-directional speaker system 3000 (FIG. 3).

Finally, first and second end caps 2300*a*, 2300*b* are arranged at first and second open ends of the sleeve 2220, respectively, to provide a finished appearance. In that regard, a first end cap 2300*a* is coupled to the base 1100*a* of the first acoustic enclosure 1060*a* (e.g., via adhesive such as a pressure sensitive adhesive), and the second end cap 2300*b* is coupled to the sleeve 2220 at the second open end of the sleeve 2220 and the second acoustic enclosure 1060*b* (e.g., via adhesive such as hot melt polyethylene).

The second end cap 2300*b* includes apertures 2320 to pen lit terminals 2340 of the electrical connector 2160 to pass therethrough. As mentioned above, the compliant member 2180 biases the PWB 2140 against the second end cap 2300*b* to help ensure that the terminals 2340 protrude through the apertures 2320 a sufficient distance the enable a sufficient electrical connection and with enough pre-load to prevent buzz.

Figure 6:
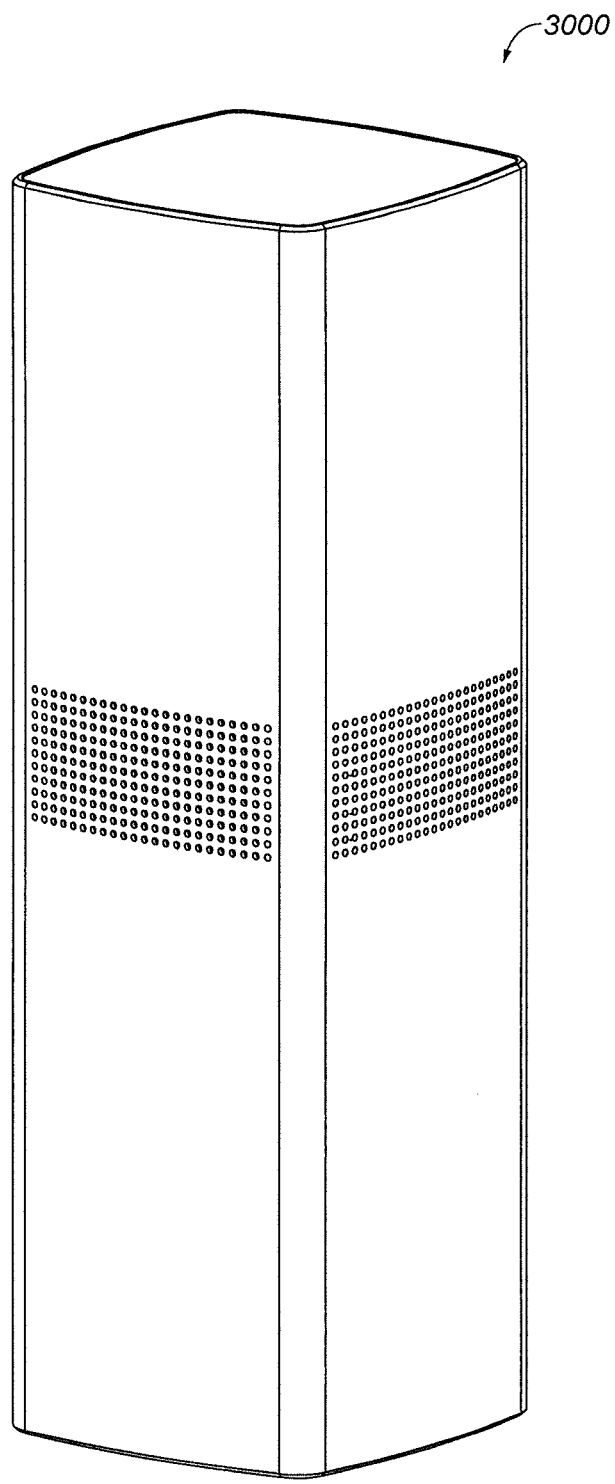
FIG. 6 is a perspective view of one example of an omni-directional satellite loudspeaker.

As shown in FIG. 6, the assembled omni-directional speaker system 3000 has a smooth outer appearance with an absence of seams along the length of the sleeve and no visible mechanical fasteners.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM.

Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (i.e., their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A multimedia system comprising:
   a console configured to manage at least one media input and at least one media output of the multimedia system and to provide audio content to a plurality of audio devices;
   first and second omnidirectional satellites coupled to the console, each satellite comprising a housing;
      the first satellite configured for placement in a first region of a listening area and to reproduce audio signals from a first channel within a first frequency range, the first frequency range being above a first cutoff frequency;
      the second satellite configured for placement in a second region of the listening area and to reproduce audio signals from a second channel within the first frequency range;
   third and fourth omnidirectional satellites coupled to the console, each of the third and fourth omnidirectional satellite loudspeakers comprising a housing defining a total acoustic volume of less than about 200 cu cm, the third omnidirectional satellite loudspeaker configured for placement in a fourth region of a listening area and to reproduce audio signals from a fourth channel within the first frequency range, and the fourth omnidirectional satellite loudspeaker configured for placement in a fifth region of the listening area and to reproduce audio signals from a fifth channel within the first frequency range:
   a central loudspeaker array coupled to the console and comprising a housing and configured for placement in a third region of the listening area substantially located between the first and second satellites;
      wherein the central loudspeaker array further comprises a plurality of audio transducers configured to reproduce audio signals from the first channel and the second channel within a second frequency range, the second frequency range being above about a second crossover frequency and below about the first crossover frequency;
      further wherein the central loudspeaker array radiates the first channel signals in the second frequency range to the left of the general location of the central loudspeaker array and radiates the second channel signals in the second frequency range to the right of the general location of the central loudspeaker array, and;
      the central loudspeaker array further configured to reproduce audio signals from a third channel within the first and second frequency ranges.

2. The multimedia loudspeaker system of claim 1 wherein the multimedia loudspeaker system further comprises an omnidirectional bass module coupled to the console to reproduce audio signals in a fourth frequency range below about the second crossover frequency.

3. The multimedia loudspeaker system of claim 1 wherein the central loudspeaker array housing defines a total acoustic volume of less than about 350 cu cm and the housings for the first and second satellite loudspeakers each define a total acoustic volume of less than about 150 cu cm.

4. The multimedia loudspeaker system of claim 1 wherein the central loudspeaker array further comprises first and second pairs of electroacoustic transducers, wherein the central loudspeaker array housing is divided into first and second acoustic enclosures, wherein rear sides of each of the first pair of electroacoustic transducers are coupled to the first acoustic enclosure, and rear sides of each of the second pair of electroacoustic transducers are coupled to the second acoustic enclosure.

5. The multimedia loudspeaker system of claim 4 wherein the first and second acoustic enclosures are waveguides.

6. The multimedia loudspeaker system of claim 1 wherein the first cutoff frequency is approximately two octaves above the second cutoff frequency.

7. The multimedia loudspeaker system of claim 6 wherein the first cutoff frequency is approximately 400 Hz.

8. The multimedia loudspeaker system of claim 1 wherein the first cutoff frequency is approximately one octave above the second cutoff frequency.

9. The multimedia loudspeaker system of claim 8 wherein the first cutoff frequency is approximately 400 Hz.

10. The multimedia loudspeaker system of claim 1 wherein the second cutoff frequency is approximately 225 Hz.

11. The multimedia loudspeaker system of claim 1 wherein the first frequency range extends from about 225 Hz to about 400 Hz.

12. The multimedia loudspeaker system of claim 1 wherein the first and second satellite loudspeakers radiate sound omnidirectionally over at least the frequency range between about 400 Hz and about 2 kHz.

13. The multimedia loudspeaker system of claim 1 wherein the first and second satellite loudspeakers radiate sound omnidirectionally over at least the frequency range between about 400 Hz and about 4 kHz.

14. The multimedia loudspeaker system of claim 1 wherein the first and second satellite loudspeakers radiate sound omnidirectionally over at least the frequency range between about 400 Hz and about 8 kHz.

15. A method for providing audio and managing media input and media output, the method comprising:
 managing, by a console, a plurality of media inputs and media outputs of the multimedia system and providing, by the console, audio content to a plurality of audio devices;
 placing in a first region of a listening area a first omnidirectional satellite loudspeaker coupled to the console, the first omnidirectional satellite loudspeaker comprising a first housing, the first omnidirectional satellite loudspeaker configured for reproduction of audio signals from a first channel within a first frequency range, the first frequency range being above a first cutoff frequency;
 placing in a second region of the listening area a second omnidirectional satellite loudspeaker coupled to the console, the second omnidirectional satellite loudspeaker comprising a second housing, the second omnidirectional satellite loudspeaker configured for reproduction of audio signals from a second channel within the first frequency range;
 placing in a third region of the listening area substantially located between the first and second satellites a central loudspeaker array coupled to the console, the central loudspeaker array comprising a plurality of electroacoustic transducers and a third housing;
 placing in a fourth region of a listening area a third omnidirectional satellite loudspeaker coupled to the console, the third omnidirectional satellite comprising a fourth housing that defines a total acoustic volume of less than about 200 cu cm, the third omnidirectional satellite configured for reproduction of audio signals from a fourth channel within the first frequency range;
 placing in a fifth region of a listening area a fourth omnidirectional satellite loudspeaker coupled to the console, the fourth omnidirectional satellite comprising a fifth housing that defines a total acoustic volume of less than about 200 cu cm, the fourth omnidirectional satellite configured for reproduction of audio signals from a fifth channel within the first frequency range;
 reproducing by the central loudspeaker array audio signals from the first channel and the second channel within a second frequency range, the second frequency range being above about a second crossover frequency and below about the first crossover frequency;
 radiating by the central loudspeaker array the first channel signals in the second frequency range to the left of the general location of the central loudspeaker array and radiating by the central loudspeaker array the second channel signals in the second frequency range to the right of the general location of the central loudspeaker array;
 radiating by the central loudspeaker array audio signals from a third channel within the first and second frequency ranges; and
 reproducing by an omnidirectional bass module coupled to the console audio signals in a fourth frequency range below about the second crossover frequency.

16. The method of providing audio and managing media input and media output of claim 15 wherein the third housing defines a total acoustic volume of less than about 350 cu cm and the first and second housings each define a total acoustic volume of less than about 200 cu cm.

17. The method for providing audio and managing media input and media output of claim 15 wherein the central loudspeaker array further comprises first and second pairs of electroacoustic transducers and wherein the third housing is divided into first and second acoustic enclosures, wherein rear sides of each of the first pair of electroacoustic transducers are coupled to the first acoustic enclosure, and rear sides of each of the second pair of electroacoustic transducers are coupled to the second acoustic enclosure.

18. The method for providing audio and managing media input and media output of claim 17 wherein the first and second acoustic enclosures are waveguides.

19. The method for providing audio and managing media input and media output of claim 15 wherein the first cutoff frequency is approximately two octaves above the second cutoff frequency.

20. The method for providing audio and managing media input and media output of claim 19 wherein the first cutoff frequency is approximately 400 Hz.

21. The method for providing audio and managing media input and media output of claim 15 wherein the first cutoff frequency is approximately one octave above the second cutoff frequency.

22. The method for providing audio and managing media input and media output of claim 21 wherein the first cutoff frequency is approximately 400 Hz.

23. The method for providing audio and managing media input and media output of claim 15 wherein the second cutoff frequency is approximately 225 Hz.

24. The method for providing audio and managing media input and media output of claim 15 wherein the first frequency range extends from about 225 Hz to about 400 Hz.

25. The method for providing audio and managing media input and media output of claim 15 wherein the first and second satellite loudspeakers radiate sound omnidirectionally over at least the frequency range between about 400 Hz and about 8 kHz.

* * * * *